(12) United States Patent
Suesada et al.

(10) Patent No.: US 8,919,859 B2
(45) Date of Patent: Dec. 30, 2014

(54) VEHICLE DOOR

(71) Applicant: Honda Motor Co., Ltd., Tokyo (JP)

(72) Inventors: Ryo Suesada, Wako (JP); Kazutaka Imamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/934,667

(22) Filed: Jul. 3, 2013

(65) Prior Publication Data

US 2014/0062123 A1 Mar. 6, 2014

(30) Foreign Application Priority Data

Aug. 31, 2012 (JP) ................................ 2012-190887

(51) Int. Cl.
*B60J 5/04* (2006.01)

(52) U.S. Cl.
CPC .............. *B60J 5/0443* (2013.01); *B60J 5/0437* (2013.01); *B60J 5/0447* (2013.01)
USPC ....................... 296/146.6; 296/152

(58) Field of Classification Search
CPC ............ B60J 5/04; B60J 5/042; B60J 5/0422; B60J 5/0423; B60J 5/0425; B60J 5/0426; B60J 5/0427; B60J 5/0429; B60J 5/043; B60J 5/0431; B60J 5/0433; B60J 5/0436; B60J 5/0468
USPC .................. 296/146.1, 146.5, 146.6, 152, 208
See application file for complete search history.

(56) References Cited

U.S. PATENT DOCUMENTS

| | | | |
|---|---|---|---|
| 5,161,759 A * | 11/1992 | Burns et al. ..................... | 248/71 |
| 6,575,525 B2 * | 6/2003 | Traister et al. ........... | 296/187.12 |
| 7,059,657 B2 * | 6/2006 | Bodin et al. ............... | 296/146.6 |
| 7,093,886 B2 * | 8/2006 | Blust et al. ................. | 296/146.6 |
| 8,109,558 B2 * | 2/2012 | Nakamori .................. | 296/146.6 |
| 8,177,285 B2 * | 5/2012 | Ishitobi et al. ............. | 296/146.6 |
| 8,210,596 B2 * | 7/2012 | Tate ........................... | 296/146.6 |

(Continued)

FOREIGN PATENT DOCUMENTS

| | | |
|---|---|---|
| JP | 4-300716 A | 10/1992 |
| JP | 6-191275 A | 7/1994 |

(Continued)

OTHER PUBLICATIONS

Japanese Office Action dated Mar. 4, 2014, issued in corresponding Japanese Application No. 2012-190887 with English summary (11 pages).

*Primary Examiner* — Gregory Blankenship
(74) *Attorney, Agent, or Firm* — Westerman, Hattori, Daniels & Adrian, LLP

(57) ABSTRACT

A vehicle door includes an elongated upper door beam and an elongated lower door beam each fixed horizontally to an inner surface of a door outer panel. Respective ends of the door beams are fixed to the inner surface of the door outer panel by fixing members. A portion of the upper door beam at an intermediate position between the ends in a longitudinal direction is coupled to the inner surface of the door outer panel by a first coupling bracket and a second coupling bracket with a seal member (a mastic sealer) interposed between the coupling brackets and the inner surface. A harness for a window regulator and a wire harness for an outer handle are installed inside a door main body. The wire harness is mounted on the first coupling bracket and the second coupling bracket.

14 Claims, 7 Drawing Sheets

(56) References Cited

U.S. PATENT DOCUMENTS

| | | | |
|---|---|---|---|
| 8,371,639 B2* | 2/2013 | Danaj et al. | 296/146.6 |
| 8,414,038 B2* | 4/2013 | Bedekar et al. | 292/216 |
| 8,444,208 B2* | 5/2013 | Inoue et al. | 296/146.6 |
| 8,454,078 B2* | 6/2013 | Sachdev et al. | 296/146.6 |
| 2012/0091750 A1* | 4/2012 | Danaj et al. | 296/146.6 |
| 2013/0049397 A1* | 2/2013 | Cohoon et al. | 296/146.6 |
| 2013/0168997 A1* | 7/2013 | Kurokawa et al. | 296/146.6 |
| 2014/0062123 A1* | 3/2014 | Suesada et al. | 296/146.6 |

FOREIGN PATENT DOCUMENTS

| | | |
|---|---|---|
| JP | 2004-338711 A | 12/2004 |
| JP | 2009-23626 A | 2/2009 |
| JP | 4368915 B2 | 11/2009 |
| JP | 2011-162118 A | 8/2011 |

* cited by examiner

VEHICLE DOOR

CROSS-REFERENCES TO RELATED APPLICATIONS

The present application claims priority under 35 U.S.C. §119 to Japanese Patent Application No. 2012-190887, filed Aug. 31, 2012, entitled "Vehicle Door." The contents of this application are incorporated herein by reference in their entirety.

TECHNICAL FIELD

The present disclosure relates to a technology for improving a door for opening and closing a door opening formed in a vehicle body.

BACKGROUND

A vehicle door includes a door beam between a door outer panel facing an area outside a vehicle and a door inner panel facing an area inside the vehicle in order to reinforce the vehicle door against an impact exerted on the vehicle door from a side of the vehicle. For example, there is known a technology for reinforcing a door outer panel with a door beam described in Japanese Patent No. 4368915.

In the technology described in Japanese Patent No. 4368915, both ends of a door beam that is made of an elongated pipe member are fixed to an inner surface of a door outer panel by fastening members. One end of a bracket is fixed to an intermediate portion of the door beam by welding, and the other end of the bracket is bonded to the inner surface of the door outer panel by a seal member, so that a vibration damping effect may be obtained.

In general, a wire harness is arranged in an area inside a vehicle door. The wire harness is mounted on a door outer panel by a bracket. However, this arrangement requires a dedicated bracket for mounting a wire harness in an area inside a vehicle door. Thus, the number of components increases, and the manufacturing costs have been higher. One measure against the above problem may be to mount a wire harness onto a door beam. However, in the case where a door beam has a closed cross section like a pipe member, it is difficult to form a mounting hole for a wire harness in the door beam.

SUMMARY

The present application describes a technology for mounting a wire harness which may reduce the number of components in a vehicle door in which a door beam having a closed cross section is coupled to a door outer panel.

The vehicle door according to one aspect of the present disclosure includes a door main body that includes a door inner panel and a door outer panel, a door beam having a closed cross section that is horizontally arranged in an area inside the door main body and ends of which are fixed to the door main body, and a coupling bracket that couples a portion of the door beam at an intermediate position along the door beam in a longitudinal direction to the door outer panel. A wire harness is arranged in the area inside the door main body and is mounted on the coupling bracket.

In the vehicle door according to this aspect, the portion of the upper door beam at an intermediate position in the longitudinal direction is coupled to the door outer panel by the coupling bracket. The wire harness is arranged in the area inside the door main body and is mounted on the coupling bracket, and thus, it is not necessary to additionally arrange a dedicated bracket for mounting a wire harness in the area inside the door main body. Since the wire harness is mounted on the vehicle door by utilizing the coupling bracket that couples the door beam having a closed cross section to the door outer panel, the number of components may be reduced, and thus, a reduction in the weight of the vehicle door and a reduction in the manufacturing costs may be achieved.

It is preferable that an operation opening that is in communication with the area inside the door main body is formed in the door inner panel, and that the door beam is arranged along an edge of the operation opening. It is preferable that a mounting position of the wire harness to the coupling bracket is located at a position that is not superposed with the operation opening in a thickness direction of the vehicle door.

In the vehicle door according to this aspect, a mounting position of the wire harness to the coupling bracket is located at a position that is not superposed with the operation opening in the thickness direction of the vehicle door, and thus, the wire harness does not interfere with mounting of a functional component such as a window regulator in the area inside the vehicle door through the operation opening. Therefore, the operation efficiency may be improved. The door beam is disposed along the edge of the operation opening. An operator may easily access the coupling bracket by inserting his/her hand into the operation opening. Therefore, the operation of mounting the wire harness may be easily performed.

It is further preferable that the door beam is disposed at a position that is superposed with the operation opening in the thickness direction of the vehicle door.

In the vehicle door according to this aspect, the door beam is disposed at the position that is superposed with the operation opening in the thickness direction of the vehicle door, and thus, the coupling bracket that is to be coupled to the door beam is positioned in the vicinity of an edge portion of the operation opening. Since the wire harness is mounted on the coupling bracket, a portion of the coupling bracket on which the wire harness is to be mounted may be positioned in the vicinity of the edge portion of the operation opening, and thus, the efficiency of operation of mounting the wire harness through the operation opening may be improved. Since the door beam is disposed at the position that is superposed with the operation opening in the thickness direction of the vehicle door, in the case of a side impact on the door outer panel, a portion of the door outer panel that may not be supported by the door inner panel due to the operation opening may be reinforced with the door beam. Therefore, the rigidity of the entire vehicle door may be enhanced.

It is further preferable that the coupling bracket includes a flange extending along the door beam in the longitudinal direction of the door beam, the flange including a mounting portion that is mounted on the door beam and a separate portion that is separated apart from the door beam in contrast to the mounting portion, and that the wire harness is mounted on the coupling bracket by being mounted on the mounting portion.

In the vehicle door according to this aspect, the coupling bracket includes the flange extending in the longitudinal direction of the door beam. Since the flange includes the mounting portion that is mounted on the door beam and the separate portion that is separated apart from the door beam in contrast to the mounting portion, the flange may be formed in a shape having a projection and a depression along the longitudinal direction of the door beam, and thus, a rigidity of the flange may be enhanced. As a result, the coupling bracket may be resistant to deflection and may be strongly fixed to the door beam. The wire harness is mounted on the mounting portion, and the mounting portion on which the wire harness is mounted may be formed in a larger area that does not interfere with the separate portion having a protruding shape. Although the wire harness requires a space of a certain size for mounting itself, the mounting portion has a space large enough for the wire harness to be mounted thereon, and thus, it is not necessary to extend the coupling bracket in order to secure a space. Therefore, the coupling bracket may be reduced in size.

It is further preferable that an outer handle is mounted on the door outer panel, and that the coupling bracket extends to the vicinity of the outer handle.

In the vehicle door according to this aspect, the outer handle is mounted on the door outer panel. Since the coupling bracket is coupled to the door outer panel, the wire harness that is to be mounted on the coupling bracket may be routed closer to the door outer panel in the thickness direction of the vehicle door. As a result, the wire harness may be routed closer to the outer handle, and the length of the wire harness may be reduced. Since the coupling bracket extends to the vicinity of the outer handle, the door beam may be disposed in the vicinity of the outer handle, and thus, displacement of the outer handle may be suppressed by the door beam in the case of a collision from a side of the vehicle, that is, a side collision. As a result, the amount of displacement of the outer handle in the case of a side collision may be smaller, and the vehicle door may be kept in a closed state.

It is further preferable that the coupling bracket extends toward a top of the vehicle door in such a manner as to be higher than the door beam.

In the vehicle door according to this aspect, the coupling bracket extends toward the top of the vehicle door in such a manner as to be higher than the door beam. Therefore, a routing operation may be performed while the wire harness is disposed on the top of the door beam, and thus, the operation efficiency may be improved.

BRIEF DESCRIPTION OF THE DRAWINGS

The advantages of the disclosure will become apparent in the following description taken in conjunction with the following drawings.

DETAILED DESCRIPTION

An embodiment of the present disclosure will now be described below with reference to the accompanying drawings.

Figure 1:
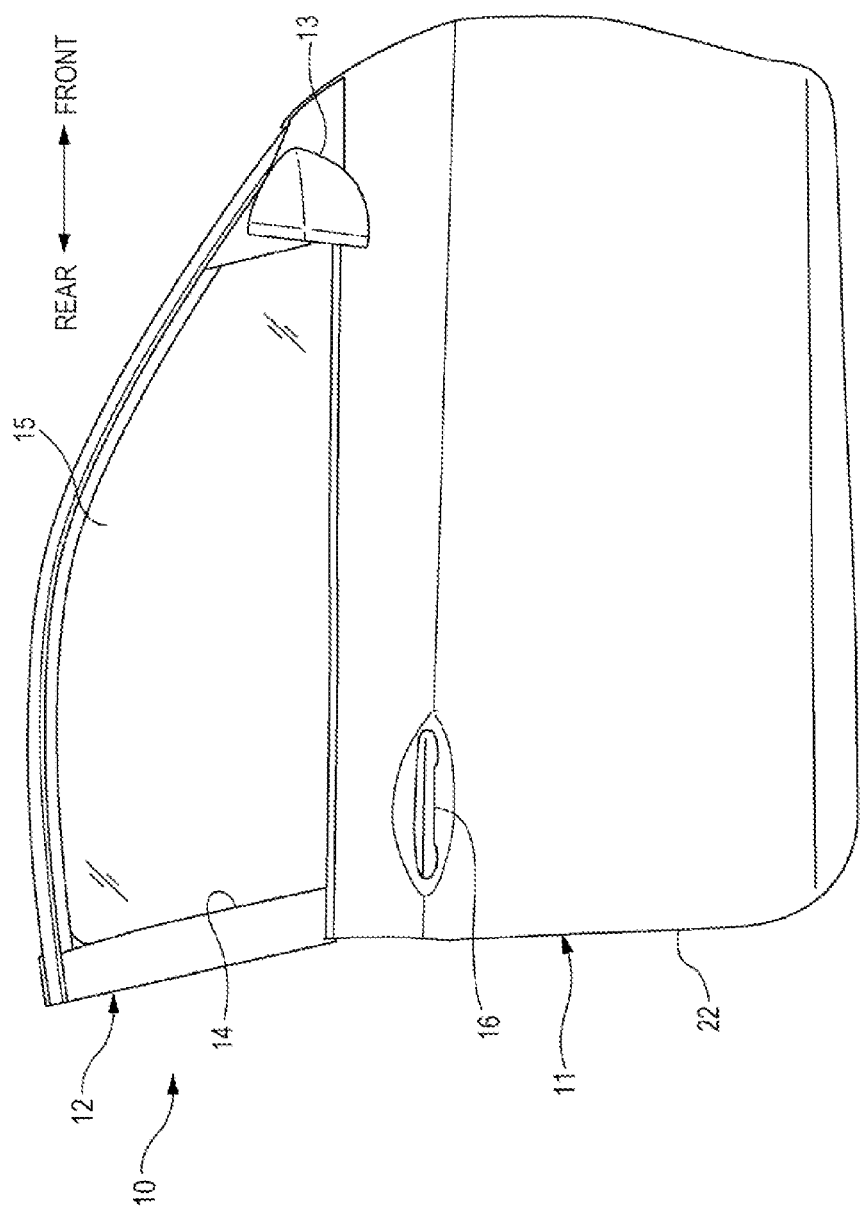
FIG. 1 is a side view of a vehicle door according to the present disclosure showing an outer side thereof.

As illustrated in FIG. 1, a vehicle door 10 is a hinged door that is, for example, provided in a side portion of a vehicle that is on the side of a driver's seat. The vehicle door 10 includes a door main body 11 and a door frame 12 that is formed in an upper portion of the door main body 11.

A door mirror 13 is provided at a corner between a front upper portion of the door main body 11 and a front lower portion of the door frame 12. A door glass 15 is provided in a window opening 14 that is surrounded by the door frame 12 and an upper edge of the door main body 11 so as to open and close the window opening 14. An outer handle 16 is mounted on a rear upper portion of the door main body 11.

Figure 2:
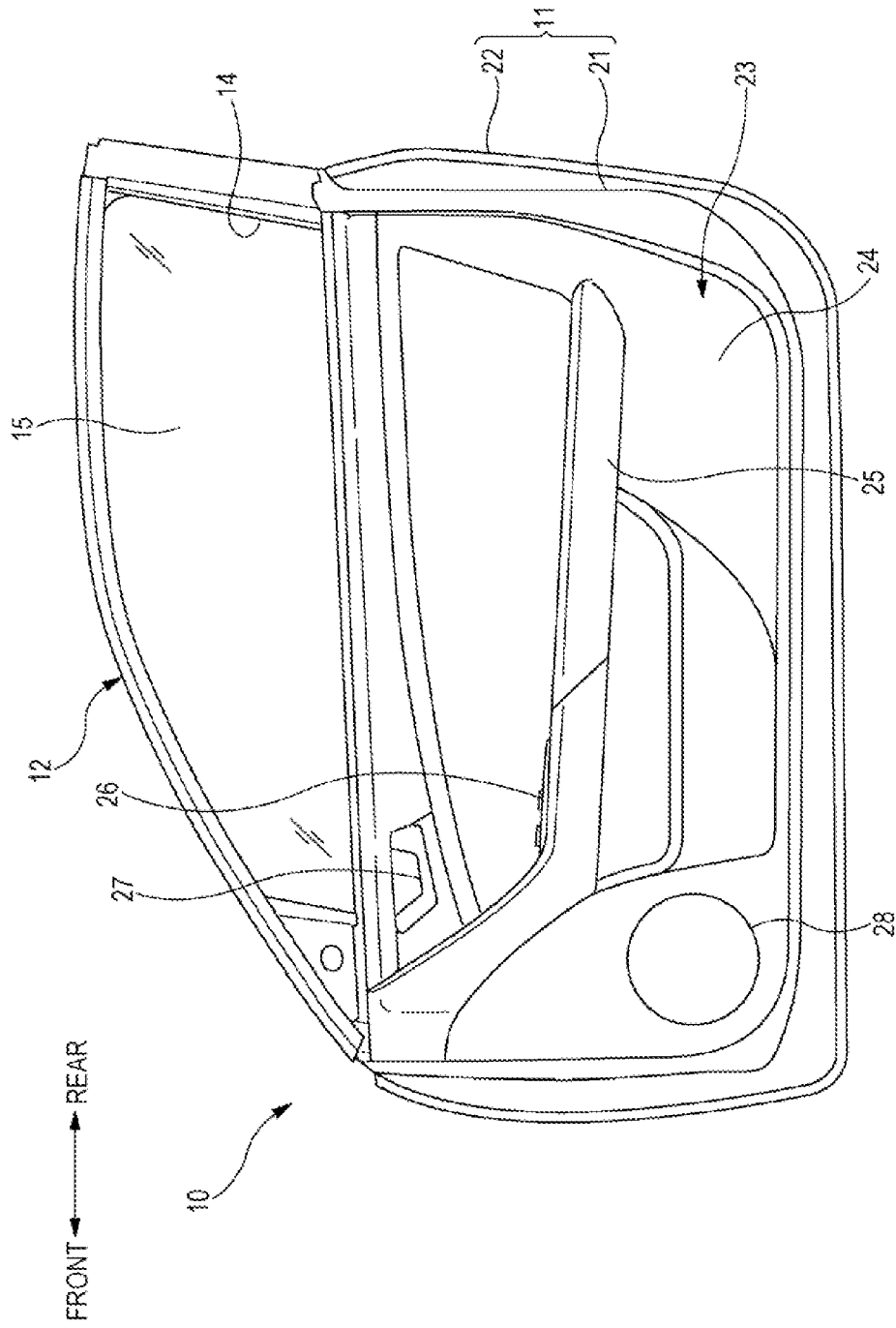
FIG. 2 is a side view of the vehicle door illustrated in FIG. 1 showing an inner side thereof.

The vehicle door 10 will now be described with reference to a side view of the vehicle door 10 showing the inner side thereof. As illustrated in FIG. 2, the door main body 11 includes a door inner panel 21 made from a metal and a door outer panel 22 made from a metal and provided on an outer side of the door inner panel 21 with respect to the vehicle. A door trim 23 is provided on an inner side of the door inner panel 21 facing the vehicle inner side.

The door trim 23 includes an armrest 25 projecting from an inner surface 24 of the door trim 23 facing the vehicle inner side toward the side opposite to the door inner panel 21, an operation switch 26 for operating a functional component disposed within the door main body 11 (described later), an inner handle 27, and a speaker 28 provided in a front lower portion of the inner surface 24.

Figure 3:
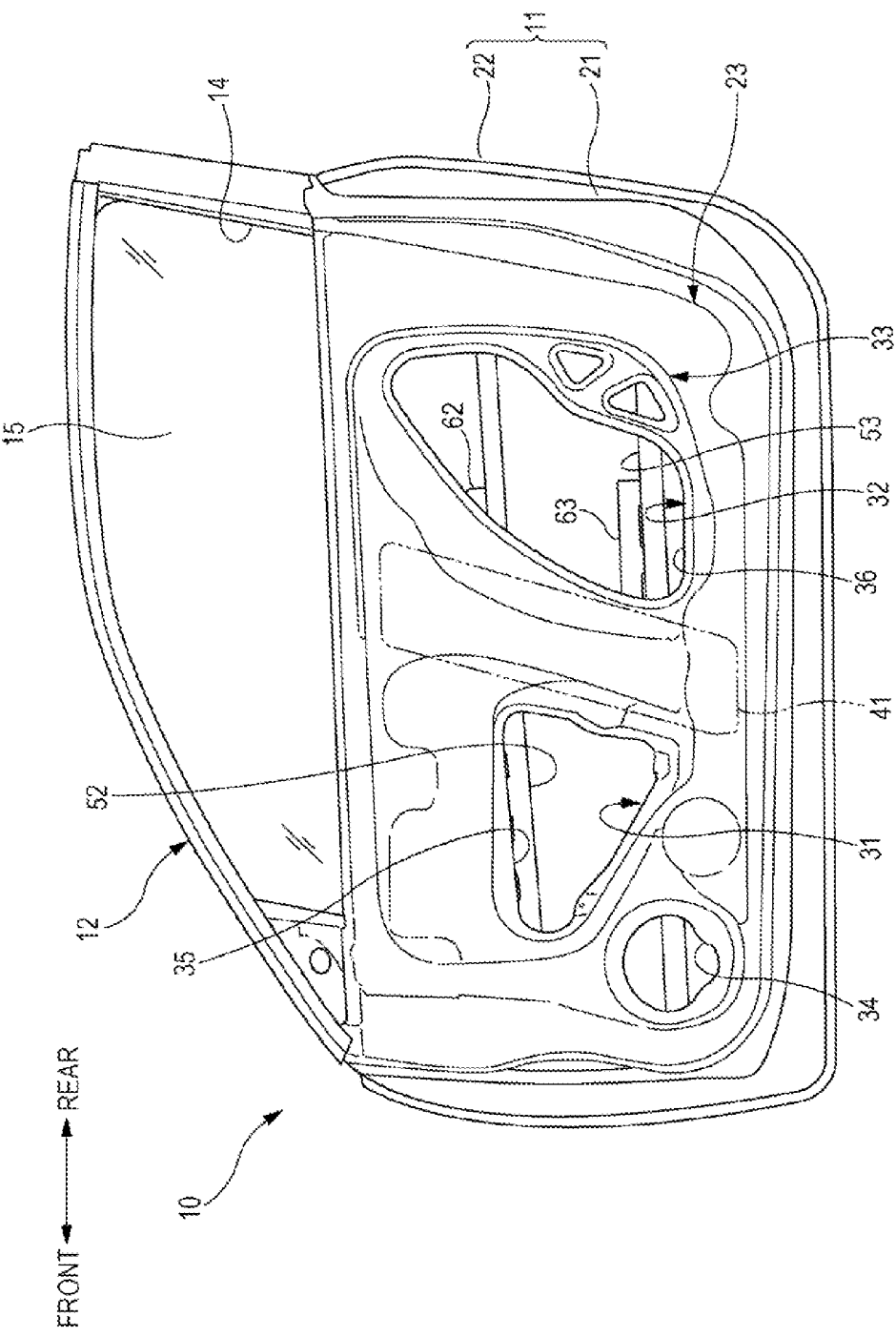
FIG. 3 is a diagram of the vehicle door illustrated in FIG. 2 without a door trim.

The vehicle door 10 without the door trim 23 will now be described. As illustrated in FIG. 3, a front operation opening 31 and a rear operation opening 32 that are in communication with the area inside the door main body 11 are formed in the door inner panel 21. A seal portion 33 to which an opening seal that covers the front operation opening 31 and the rear operation opening 32 is to be affixed is formed around edges of the front operation opening 31 and the rear operation opening 32.

A speaker mounting opening 34 for mounting the speaker 28 (see FIG. 2) is formed in the door inner panel 21 in front of the front operation opening 31. A window regulator 41 that is the functional component is provided inside the door main body 11. The window regulator 41 causes the door glass 15 to move up and down. Note that the functional component is not limited to the window regulator 41 and includes components that enhance functionality of the vehicle door 10 such as a door latch.

The front operation opening 31 has a substantially inverted triangle shape. An upper edge 35 of the front operation opening 31 is formed so as to be substantially straight. The rear operation opening 32 is formed in a vertically elongated shape such that a rear portion of the rear operation opening 32 is raised higher than a front portion of the rear operation opening 32. A lower edge 36 of the rear operation opening 32 is formed so as to be substantially straight.

Figure 4:
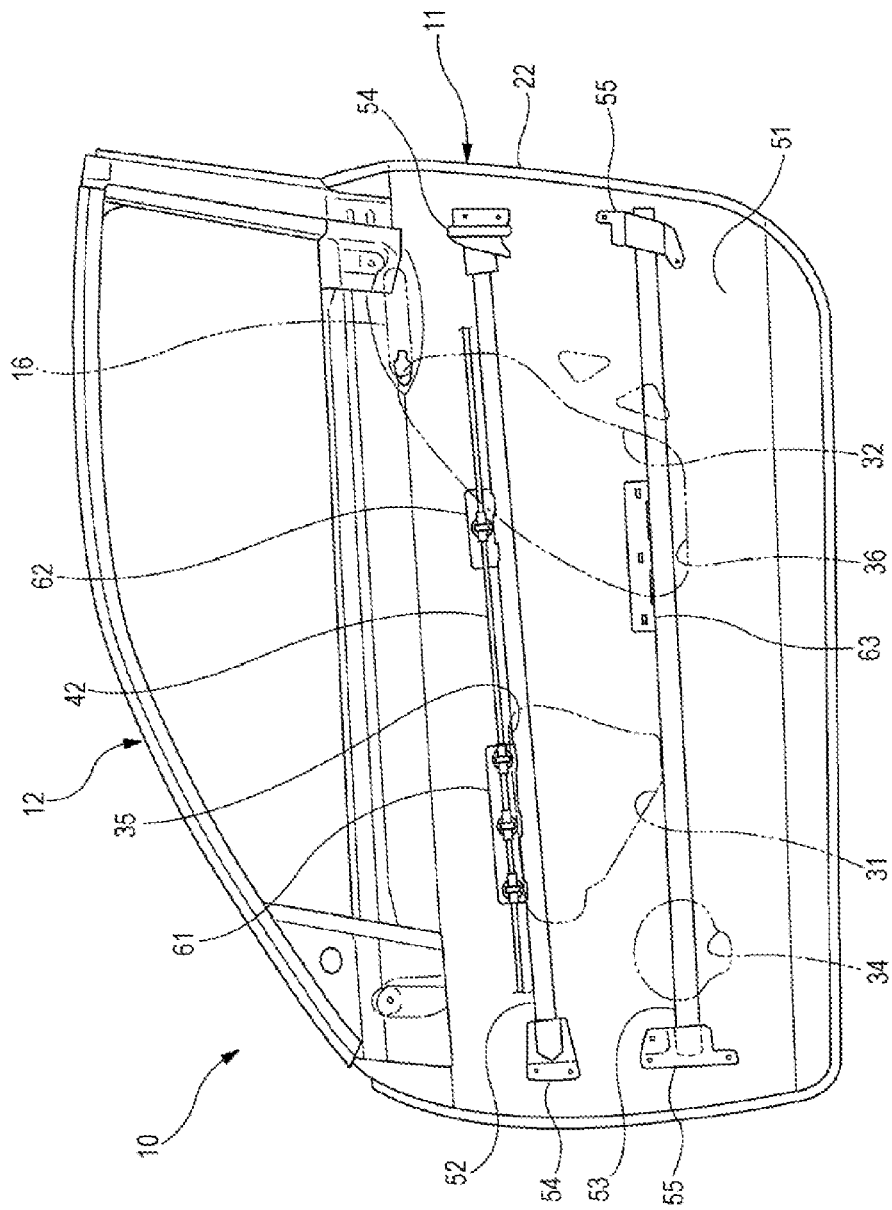
FIG. 4 is a diagram of the vehicle door illustrated in FIG. 3 without a door inner panel.

The vehicle door 10 without the door inner panel 21 will now be described. As illustrated in FIG. 4, an upper door beam 52 and a lower door beam 53 each having an elongated shape are horizontally fixed to an inner surface 51 of the door outer panel 22. Ends of the upper door beam 52 and ends of the lower door beam 53 are fixed to the inner surface 51 of the door outer panel 22 (see FIG. 4) by fixing members 54 and fixing members 55, respectively.

Portions of the upper door beam 52 at intermediate positions in a longitudinal direction are coupled to the inner surface 51 of the door outer panel 22 by a first coupling bracket 61 and a second coupling bracket 62 with a seal member (a mastic sealer) interposed between the first coupling bracket 61 and the inner surface 51, as well as the second coupling bracket 62 and the inner surface 51. A portion of the lower door beam 53 at an intermediate position in a longitudinal direction is coupled to the inner surface 51 of the door outer panel 22 by a third coupling bracket 63 with a seal member (a mastic sealer) interposed between the third coupling bracket 63 and the inner surface 51.

The portions of the upper door beam 52 at intermediate positions in the longitudinal direction and the portion of the lower door beam 53 at an intermediate position in the longitudinal direction are separated apart from the inner surface 51 of the door outer panel 22 in a thickness direction of the vehicle door 10. In the case where the door outer panel 22 is curved for design reasons, distances from the inner surface 51 of the door outer panel 22 to the upper door beam 52 and the lower door beam 53 vary depending on the positions of those portions on the upper door beam 52 and the lower door beam 53 in the longitudinal direction. However, variations in the distances may be accommodated by use of the first coupling bracket 61, the second coupling bracket 62, and the third coupling bracket 63, and the door beams 52, 53 may be coupled to the door outer panel 22 by use of the first coupling bracket 61, the second coupling bracket 62, and the third coupling bracket 63.

The upper door beam 52 is arranged along the upper edge 35 of the front operation opening 31. The lower door beam 53 is arranged along the lower edge 36 of the rear operation opening 32. Therefore, the front operation opening 31 and the rear operation opening 32 are not blocked by the upper door beam 52 and the lower door beam 53, and thus, operation for maintenance of the area inside the door main body 11 may be performed with good efficiency.

A harness for the window regulator 41 (see FIG. 3) and a wire harness 42 for the outer handle 16 are arranged in the area inside the door main body 11. The wire harness 42 is mounted to the first coupling bracket 61 and the second coupling bracket 62. Note that the wire harness 42 is a harness for supplying power to and for transmitting and receiving signals from and to a door lock remote control device (a smart lock) provided in the outer handle 16.

A mounting position of the wire harness 42 to the first coupling bracket 61 is not superposed with the front operation opening 31 in the thickness direction of the vehicle door 10. Therefore, the wire harness 42 does not interfere with operation through the front operation opening 31, and thus, the operation may be performed with good efficiency.

The upper door beam 52 is disposed at a position that is superposed with the front operation opening 31 in the thickness direction of the vehicle door 10. This allows an easy access to the first coupling bracket 61 through the front operation opening 31, and the efficiency of the operation of mounting the wire harness 42 onto the first coupling bracket 61 may be improved.

The first coupling bracket 61 extends toward the top of the vehicle door 10 in such a manner as to be higher than the upper door beam 52. Therefore, the operation of mounting the wire harness 42 onto the first coupling bracket 61 may be performed while the wire harness 42 is disposed on the top of the upper door beam 52, and thus, the operation efficiency may be further improved.

Note that harnesses to be mounted onto the first coupling bracket 61, the second coupling bracket 62, and the third coupling bracket 63 are not limited to the wire harness 42 and may be other harnesses such as a harness for the window regulator 41.

The second coupling bracket 62 is arranged in such a manner as to extend to the vicinity of the outer handle 16, and thus, the vicinity of the outer handle 16 may be supported by the upper door beam 52. Therefore, in the case of a side collision, when an impact force is applied to the door outer panel 22, displacement of the outer handle 16 may be suppressed by the upper door beam 52 that is arranged in the vicinity of the outer handle 16.

Figure 5:
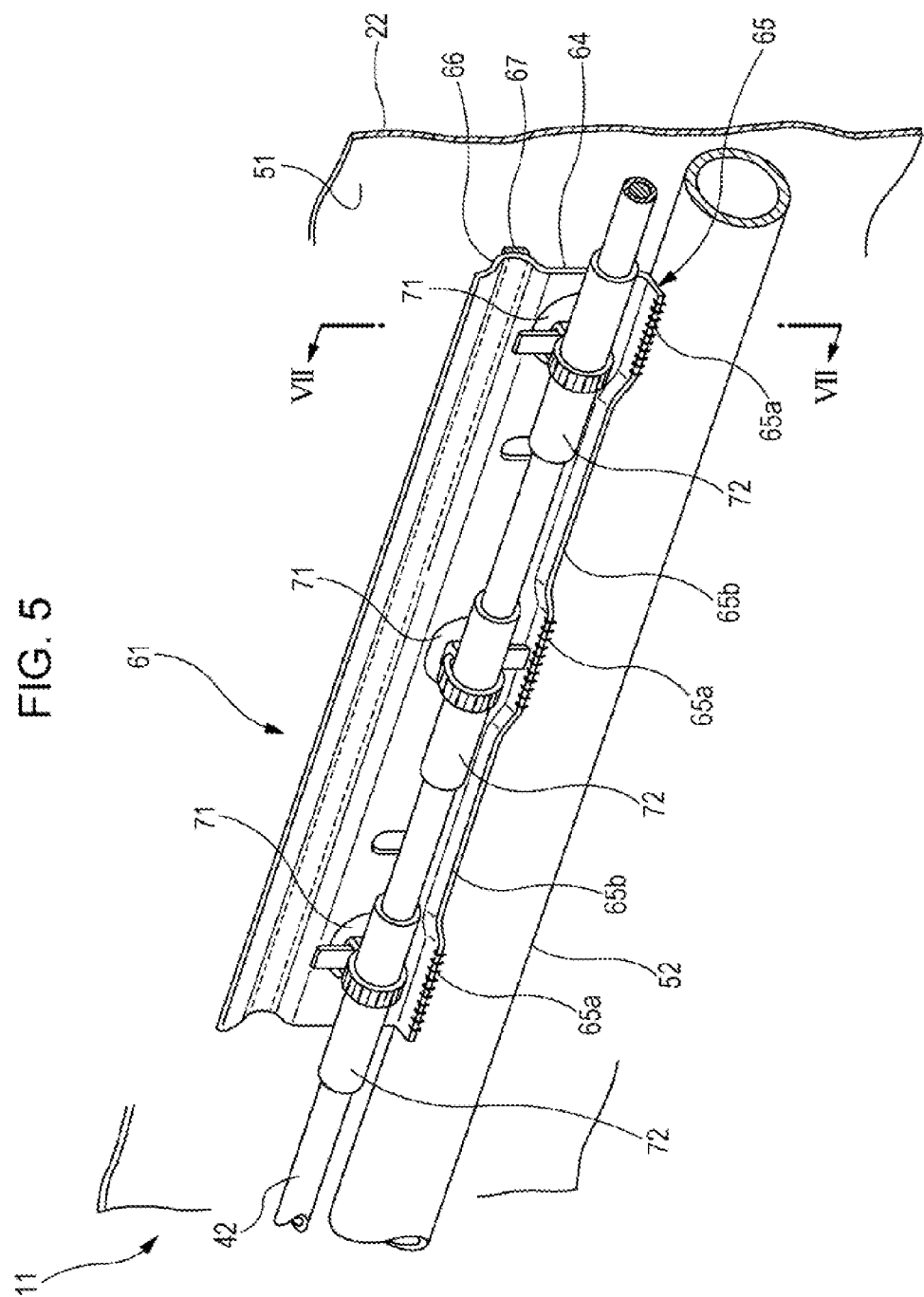
FIG. 5 is a perspective view of a principal portion of the vehicle door according to the present disclosure.

A principal portion of the vehicle door 10 according to the present disclosure will now be described in detail. As illustrated in FIG. 5, the first coupling bracket 61 includes a main body 64 extending along the longitudinal direction of the door beam 52, a flange 65 formed in a lower portion of the main body 64, and a curved portion 66 formed in an upper portion of the main body 64.

The flange 65 extends along the longitudinal direction of the door beam 52 and includes mounting portions 65a that are welded to the upper door beam 52 and separate portions 65b that are separated apart from the upper door beam 52 in contrast to the mounting portions 65a.

The curved portion 66 extends along the longitudinal direction of the door beam 52, and an outer apex portion of the curved shape of the curved portion 66 is bonded to the inner surface 51 of the door outer panel 22 with a seal member 67 (a mastic sealer). Since the curved portion 66 extends in the longitudinal direction of the door beam 52, the rigidity of the first coupling bracket 61 may be enhanced.

Clips 71 are provided in the vicinity of the mounting portions 65a of the main body 64. The wire harness 42 is attached to the clips 71 via tubes 72. The main body 64 includes larger space for receiving the clips 71 in the vicinity of the mounting portions 65a than in the vicinity of the separate portions 65b. Therefore, the clips 71 may be mounted on the main body 64 without enlarging the main body 64 in a top-bottom direction. As a result, a reduction in the size of the first coupling bracket 61 may be achieved.

In this embodiment, the first coupling bracket 61 is provided with three mounting portions 65a and two separate portions 65b, and the mounting portions 65a and the separate portions 65b are alternately formed. However, the number of the mounting portions 65a and the number of the separate portions 65b are not limited to the above and may be suitably changed. For example, the number of the mounting portions 65a may be one, and the number of the separate portions 65b may be two. Such variations may also be made for the second coupling bracket 62 and the third coupling bracket 63.

Figure 6:
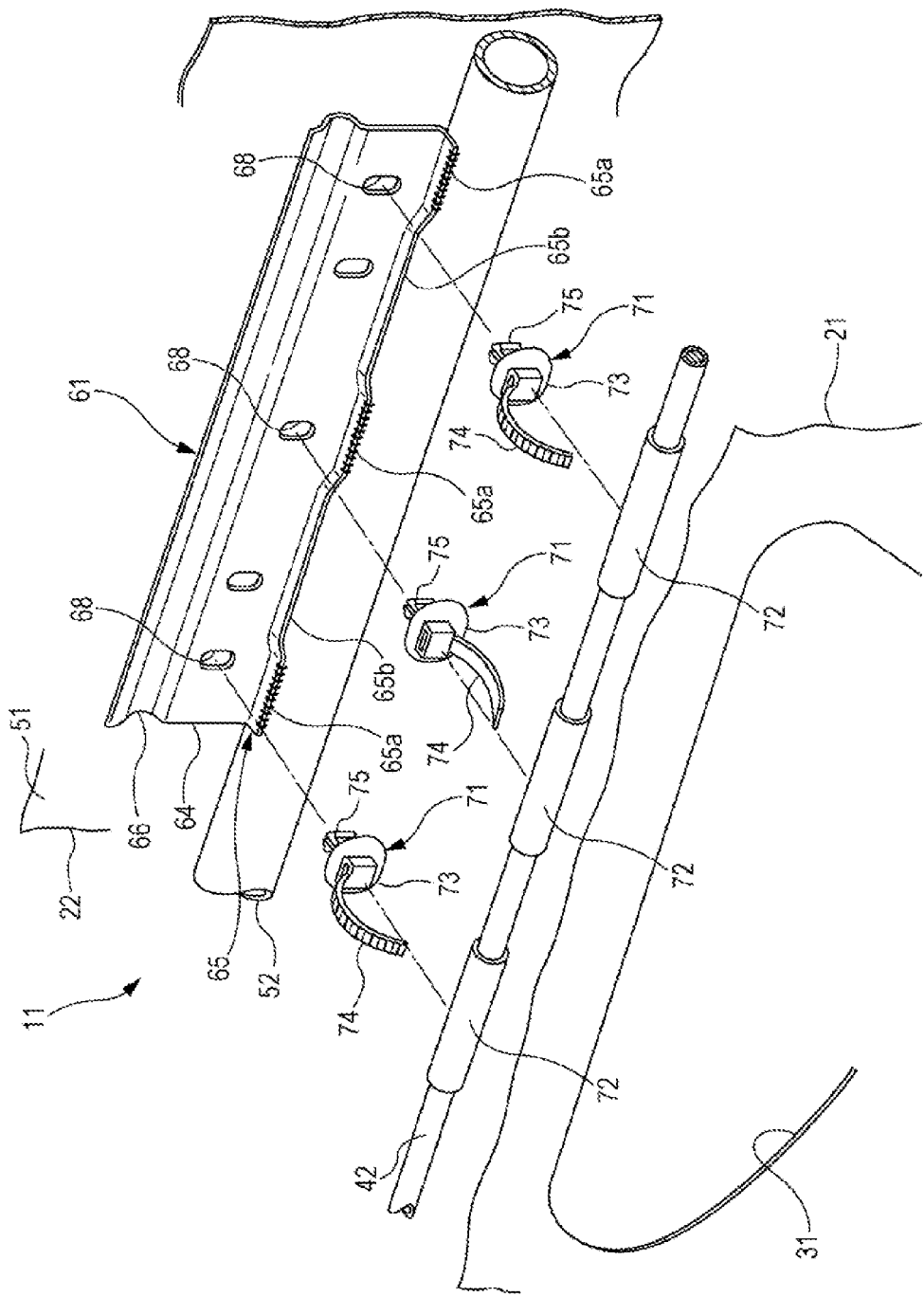
FIG. 6 is an exploded perspective view of the principal portion of the vehicle door according to the present disclosure.

The mounting of the wire harness 42 onto the first coupling bracket 61 will now be described. As illustrated in FIG. 6, each of the clips 71 includes a base 73, a band portion 74 formed on the base 73, a hook portion 75 formed on a side of the base 73 positioned opposite to the band portion 74. Latch openings 68 into which the hook portions 75 may be inserted are formed in the first coupling bracket 61.

The tubes 72 of the wire harness 42 are fixed to the band portions 74 of the clips 71. The hook portions 75 of the clips 71 are inserted into the latch openings 68 of the first coupling bracket 61. The above series of operations may be performed through the front operation opening 31 of the door inner panel 21.

Figure 7:
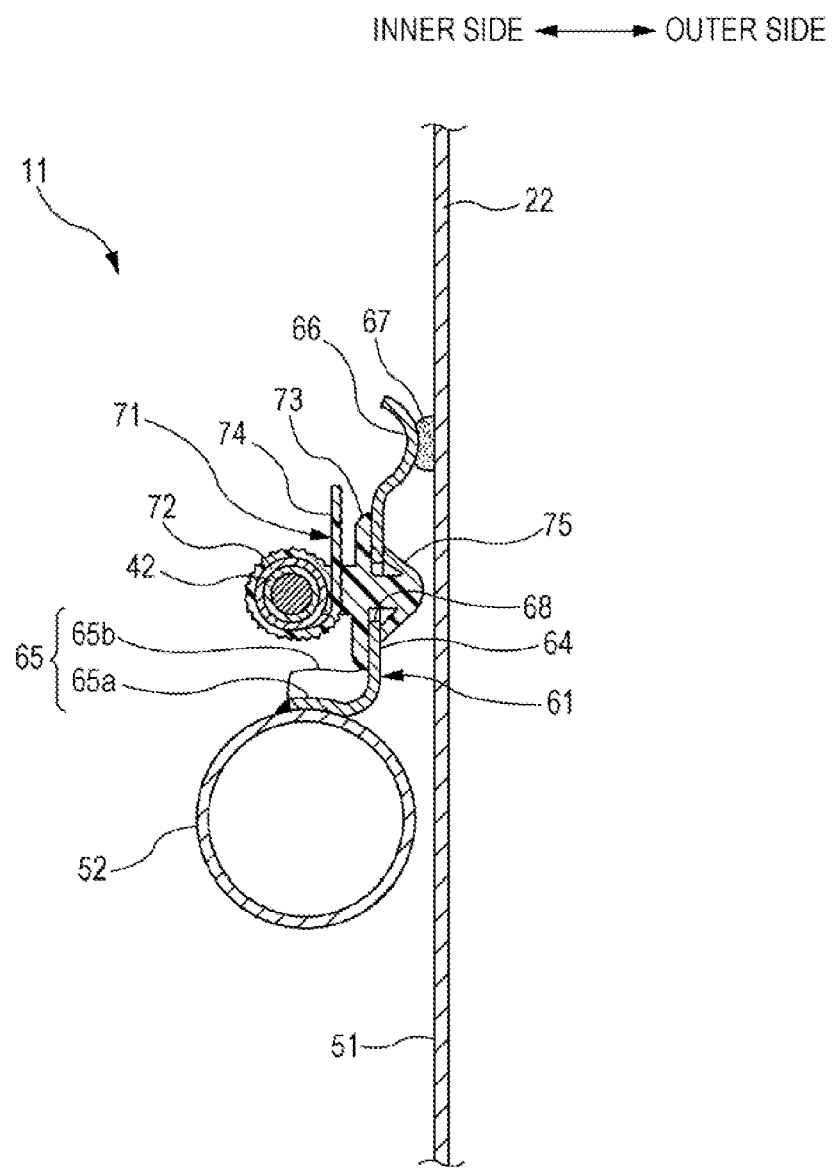
FIG. 7 is a sectional view taken along line VII-VII of FIG. 5.

The principal portion of the vehicle door 10 according to the present disclosure with the wire harness 42 mounted on the first coupling bracket 61 will now be described. As illustrated in FIG. 7, the upper door beam 52 is a hollow member having a pipe shape. The outer side of the upper door beam 52 in the thickness direction of the vehicle door 10 is separated apart from the inner surface 51 of the door outer panel 22. The mounting portions 65a of the first coupling bracket 61 are welded to an upper portion of the upper door beam 52. The first coupling bracket 61 extends upward, and the curved portion 66 is fixed to the inner surface 51 of the door outer panel 22 by the seal member 67.

The base 73 of each of the clips 71 is mounted on the main body 64 of the first coupling bracket 61 by inserting the hook portion 75 of each of the clips 71 into the corresponding one of the latch openings 68 of the first coupling bracket 61. A lower end of the bases 73 is positioned lower than an upper end of the separate portions 65b. The lower end of the bases 73 is positioned higher than an upper end of the mounting portions 65a of the flange 65. Each of the clips 71 is disposed in the vicinity of the corresponding one of the mounting portions 65a of the main body 64, so that the length of the main body 64 in the top-bottom direction may be reduced.

The vehicle door 10 described above is summarized as follows.

As illustrated in FIG. 4, in the vehicle door 10, the portions of the upper door beam 52 at intermediate positions in the longitudinal direction are coupled to the door outer panel 22 by the first coupling bracket 61 and the second coupling bracket 62. The wire harness 42 is arranged in the area inside the door main body 11. The wire harness 42 is mounted on the first coupling bracket 61 and the second coupling bracket 62, and thus, it is not necessary to additionally arrange a dedicated bracket for mounting a wire harness in the area inside the door main body 11. Since the wire harness 42 is mounted on the vehicle door 10 by utilizing the first coupling bracket 61 and the second coupling bracket 62 that couple the upper door beam 52 having a closed cross section to the door outer panel 22, the number of components may be reduced, and thus, a reduction in the weight of the vehicle door 10 and a reduction in the manufacturing costs may be achieved.

As illustrated in FIG. 4, the mounting position of the wire harness 42 to the first coupling bracket 61 is located at a position that is not superposed with the front operation opening 31 in the thickness direction of the vehicle door 10. Therefore, the wire harness 42 does not interfere with mounting of a functional component such as the window regulator 41 in the area inside the vehicle door 10 through the front operation opening 31, and thus, the operation efficiency may be improved. The upper door beam 52 is disposed along the upper edge 35 of the front operation opening 31. An operator may easily access the first coupling bracket 61 by inserting his/her hand through the front operation opening 31. Therefore, the operation of mounting the wire harness 42 may be easily performed.

As illustrated in FIG. 4, the upper door beam 52 is disposed at a position that is superposed with the front operation opening 31 in the thickness direction of the vehicle door 10, and thus, the first coupling bracket 61 coupled to the upper door beam 52 is positioned in the vicinity of an edge portion of the front operation opening 31. Since the wire harness 42 is mounted on the first coupling bracket 61, a portion of the first coupling bracket 61 on which the wire harness 42 is to be mounted may be positioned in the vicinity of the edge portion of the front operation opening 31. Therefore, the efficiency of operation of mounting the wire harness 42 through the front operation opening 31 may be improved. Since the upper door beam 52 is disposed at a position that is superposed with the front operation opening 31 in the thickness direction of the vehicle door 10, in the case of a side impact on the door outer panel 22, a portion of the door outer panel 22 that may not be supported by the door inner panel 21 due to the front operation opening 31 may be reinforced by the upper door beam 52. Therefore, the rigidity of the entire vehicle door 10 may be enhanced.

As illustrated in FIG. 5, the first coupling bracket 61 includes the flange 65 extending in the longitudinal direction of the door beam 52. The flange 65 includes the mounting portions 65a mounted on the upper door beam 52 and the separate portions 65b separated apart from the upper door beam 52 in contrast to the mounting portions 65a. Therefore, the flange 65 may be formed in a shape having projections and depressions along the longitudinal direction of the upper door beam 52, and thus, rigidity of the flange 65 may be improved. As a result, the first coupling bracket 61 may be resistant to deflection and may be strongly fixed to the upper door beam 52. The wire harness 42 is to be mounted on the mounting portions 65a, and the mounting portions 65a on which the wire harness 42 is to be mounted may be formed in larger areas that do not interfere with the separate portions 65b each having a protruding shape. Although each of the mounting portions 65a on which the wire harness 42 is to be mounted requires a space of a certain size, each of the mounting portions 65a has a space large enough for the wire harness 42 to be mounted thereon, and thus, it is not necessary to extend the first coupling bracket 61 in order to secure a space. Therefore, the first coupling bracket 61 may be reduced in size.

As illustrated in FIG. 4, the outer handle 16 is mounted on the door outer panel 22. Since the first coupling bracket 61 is coupled to the door outer panel 22, the wire harness 42 that is to be mounted on the first coupling bracket 61 may be routed close to the door outer panel 22 in the thickness direction of the vehicle door 10. As a result, the wire harness 42 may be routed close to the outer handle 16, and the length of the wire harness 42 may be reduced. Since the second coupling bracket 62 extends to the vicinity of the outer handle 16, the upper door beam 52 may be arranged in the vicinity of the outer handle 16, and thus, displacement of the outer handle 16 may be suppressed by the upper door beam 52 in the case of a side collision. As a result, the amount of displacement of the outer handle 16 in the case of a side collision may be small, and the vehicle door 10 may be kept in a closed state.

As illustrated in FIG. 5, the first coupling bracket 61 extends toward the top of the vehicle door 10 in such a manner as to be higher than the upper door beam 52. Therefore, a routing operation may be performed while the wire harness 42 is disposed on the top of the upper door beam 52, and thus, the operation efficiency may be improved.

Note that the dimension of the first coupling bracket 61 in a longitudinal direction of the first coupling bracket 61 may be suitably changed. Similarly, the dimensions of the second coupling bracket 62 and the third coupling bracket 63 in longitudinal directions of the second coupling bracket 62 and the third coupling bracket 63 may be suitably changed. In addition, the number of coupling brackets may be suitably changed in accordance with the lengths of the upper door beam 52 and the lower door beam 53 and the shape of the door main body 11.

The technology according to the present disclosure is suitable for a vehicle door in which a door beam is coupled to a door main body by a coupling bracket.

We claim:
1. A vehicle door comprising:
   a door main body including a door inner panel and a door outer panel;
   a door beam disposed inside the door main body in a lateral orientation, the door beam having a closed cross section and including a longitudinal one end and a longitudinal opposite end, each fixed to the door main body;
   a coupling bracket coupling an intermediate portion of the door beam located between the one end and the opposite end to the door outer panel; and
   a wire harness arranged inside the door main body and attached to the coupling bracket,
   wherein the coupling bracket includes a main body and a flange extending from the main body, the flange also extending along the longitudinal direction of the door beam, the flange including a mounting portion mounted on the door beam, and a separate portion separated apart from the door beam, wherein the wire harness is attached to the main body at position corresponding to the mounting portion, wherein the coupling bracket includes a clip fastening the wire harness, wherein the clip is disposed right above the mounting portion, and wherein the clip includes a lower edge located lower than a vertical position of the separate portion of the flange.

2. The vehicle door according to claim 1, wherein the door inner panel includes an operation opening in communication with the inside of the door main body, wherein the door beam is arranged along an edge of the operation opening, and wherein the wire harness is attached to the coupling bracket at a position not superposed with the operation opening in a thickness direction of the vehicle door.

3. The vehicle door according to claim 2, wherein the door beam is disposed at a position superposed with the operation opening in the thickness direction of the vehicle door.

4. The vehicle door according to claim 1, wherein the door outer panel includes an outer handle mounted thereon, and wherein the coupling bracket extends to a vicinity of the outer handle.

5. The vehicle door according to claim 1, wherein the coupling bracket extends upward with respect to the door beam.

6. The vehicle door according to claim 1, wherein the separate portion of the flange is separated apart from the door beam toward upward direction.

7. The vehicle door according to claim 5, wherein the coupling bracket is mounted on the top of the door beam.

8. A vehicle door comprising:

a door main body including a door inner panel and a door outer panel;

a door beam disposed inside the door main body in a lateral orientation, the door beam having a closed cross section and including a longitudinal one end and a longitudinal opposite end, each fixed to the door main body;

a coupling bracket coupling an intermediate portion of the door beam located between the one end and the opposite end to the door outer panel; and a wire harness arranged inside the door main body and attached to the coupling bracket, wherein the coupling bracket includes a flange extending along the door bean and along a longitudinal direction of the door beam, the flange including a mounting portion mounted on the door beam, and a separate portion separated apart from the door beam, the flange includes a first part and a second part intersecting with each other to make a L-shape in cross section, the first part of the flange includes the mounting portion and the separate portion next to the mounting portion in the longitudinal direction of the door beam, the second part of the flange includes an opening disposed at a position corresponding to the mounting portion along the longitudinal direction of the door beam, and the wire harness includes an engagement member engaged with the opening to attach the wire harness to the coupling bracket.

9. The vehicle door according to claim 8, wherein the door inner panel includes an operation opening in communication with the inside of the door main body, wherein the door beam is arranged along an edge of the operation opening, and wherein the wire harness is attached to the coupling bracket at a position not superposed with the operation opening in a thickness direction of the vehicle door.

10. The vehicle door according to claim 9, wherein the door beam is disposed at a position superposed with the operation opening in the thickness direction of the vehicle door.

11. The vehicle door according to claim 8, wherein the door outer panel includes an outer handle mounted thereon, and wherein the coupling bracket extends to a vicinity of the outer handle.

12. The vehicle door according to claim 8, wherein the coupling bracket extends upward with respect to the door beam.

13. The vehicle door according to claim 8, wherein the separate portion of the flange is separated apart from the door beam toward upward direction.

14. The vehicle door according to claim 12, wherein the coupling bracket is mounted on the top of the door beam.

* * * * *